April 8, 1969
F. J. HAYNES
3,436,849
BACK HOE APPARATUS HAVING MOVABLE TEETH
Filed Dec. 20, 1965
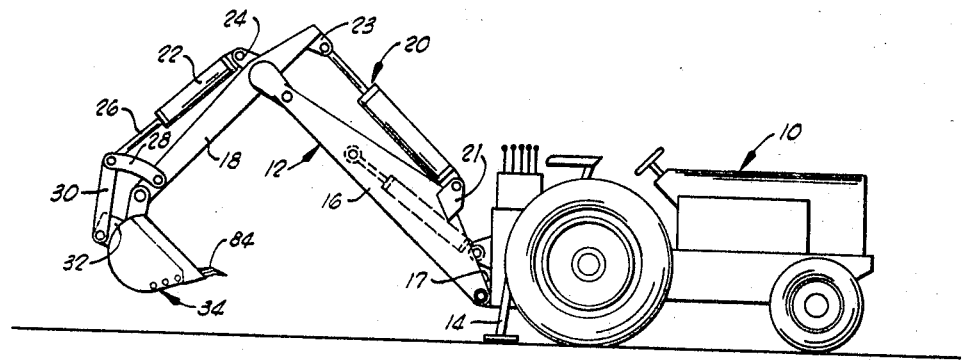
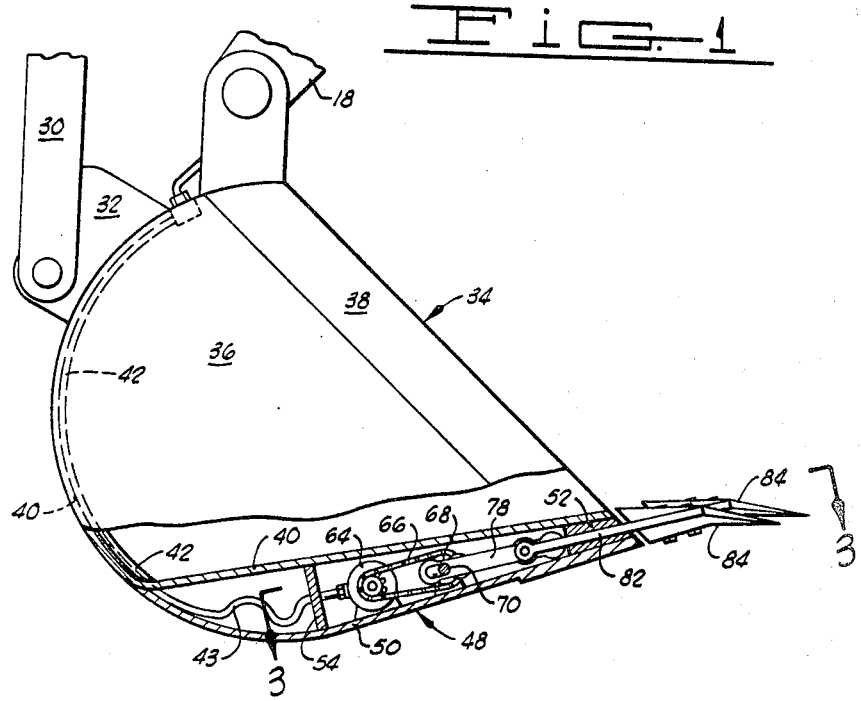
INVENTOR.
FREDDIE J. HAYNES
BY
Dunlap and Laney
ATTORNEYS

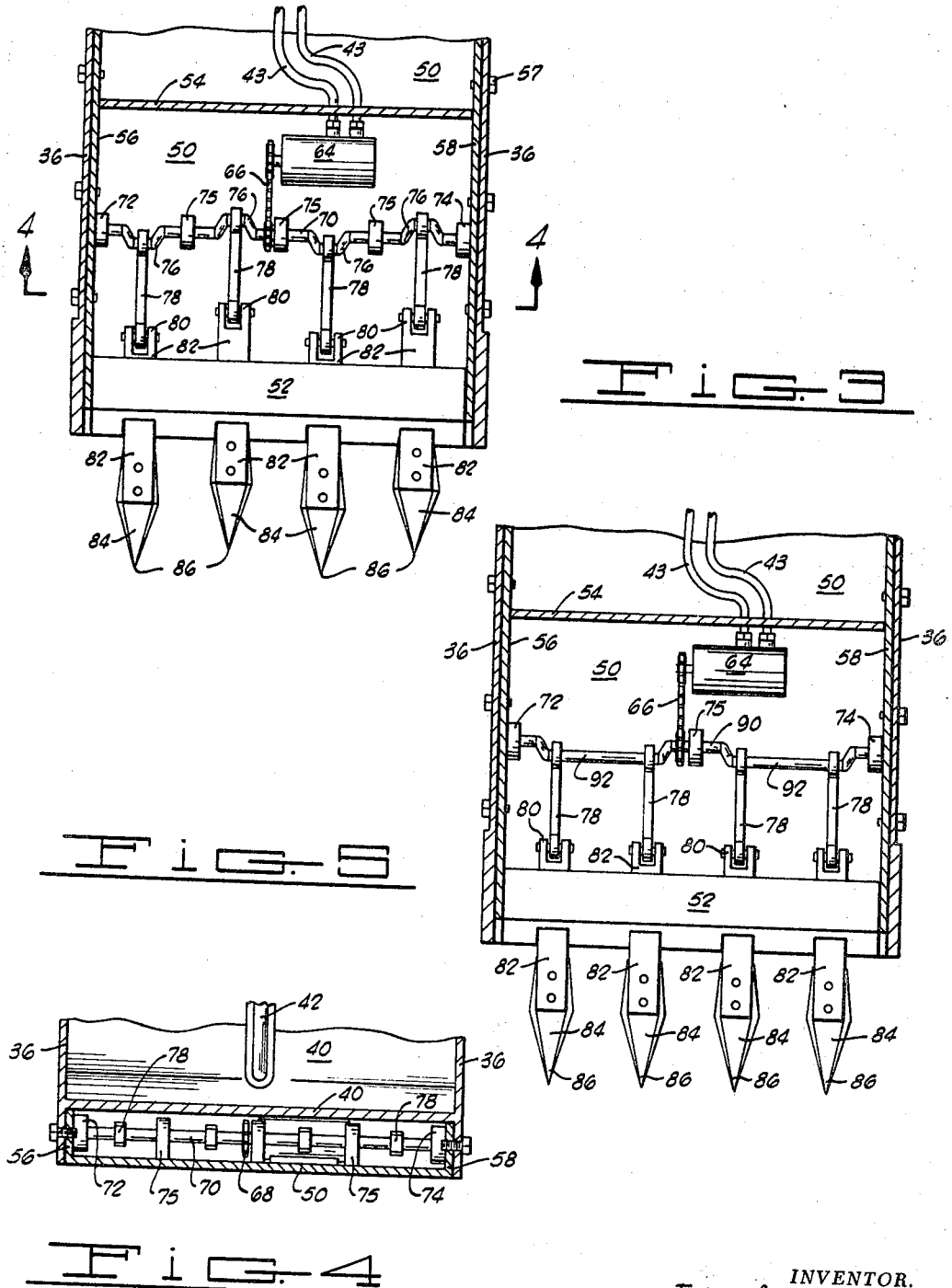

INVENTOR.
FREDDIE J. HAYNES
BY
ATTORNEYS

United States Patent Office 3,436,849
Patented Apr. 8, 1969

3,436,849
BACK HOE APPARATUS HAVING MOVABLE
TEETH
Freddie J. Haynes, 1025 Woodcrest Drive,
Midwest City, Okla. 73110
Filed Dec. 20, 1965, Ser. No. 514,817
Int. Cl. E02f 3/70, 5/14, 3/86
U.S. Cl. 37—141
5 Claims

ABSTRACT OF THE DISCLOSURE

A back hoe apparatus including an earth moving bucket movably mounted on a vehicle and having reciprocably mounted at the leading, digging edge of the bucket, a plurality of hydraulically driven earth-penetrating tines. A motor and tine driving linkage are mounted in a closed chamber beneath the bucket, with such chamber being formed by the earth-supporting bottom wall of the bucket and a detachable unit which includes a second bottom wall, a pair of side walls and a bearing block.

---

This invention relates to an improved back hoe of the type which is connected behind a tractor or similar vehicle and utilized to move earth by means of a bucket or shovel. More specifically, the present invention relates to a back hoe of the described type having a plurality of reciprocating and/or laterally moving teeth which improve the digging efficiency of the shovel or bucket of the back hoe assembly.

Back hoes of the type having a bucket-like structure carried on the end of an arm or boom, and actuated hydraulically to assume various positions, are widely used for trenching or moving large quantities of earth from one location to the other. A difficulty which has been encountered with back hoes of conventional construction is their inability to quickly and efficiently cut or bite through hardpan or rocky soils, and to maintain substantially the same rate of operation in soils of this type as is characteristc of this equipment in relatively soft soils. The present invention undertakes to improve back hoes of the general type described by providing for vibration and reciprocation of earth-penetrating teeth carried at the front end of the back hoe bucket or shovel so that the impact of these teeth on relatively hard soil or rocks can be relied upon to improve the rate at which the apparatus cuts away and removes soil.

Broadly described, the present invention comprises an improvement in earth moving equipment of the general type which includes a vehicle, a support structure mounted on the vehicle and an earth moving bucket pivotally mounted on the support structure. This improvement comprises a plurality of earth-penetrating tines which are movably mounted on the lower side of the bucket, and adjacent the open, earth-contacting forward side of the bucket, the tines projecting from the bucket in a direction such that they penetrate the earth ahead of the earth moving bucket as the bucket is swung downwardly and into the earth; and power means mounted on the bucket and drivingly connected to the earth-penetrating tines for moving these tines in relation to the bucket. In a preferred embodiment of the invention, the earth-penetrating tines are reciprocated in rectilinear motion in the general direction of movement of the bucket, and are mounted on the leading edge of the bucket so that the tines impact or strike against the hard soil or rock which is to removed, and thus break up or disintegrate this material so that it may be scooped up or loaded into the earth removing bucket. The power means which is utilized to drive the tines is preferably a hydraulically driven motor which is mounted in a compartment disposed beneath the upper wall of a double bottom provided in the bucket, and is completely enclosed by the double bottom walls and side walls provided on the bucket. A suitable drive system interconnects the hydraulic motor with the several earth-penetrating tines which are provided and preferably is capable of driving the tines in a sideways or lateral motion with respect to the bucket, as well as in the reciprocating rectilinear motion hereinbefore described.

It should also be pointed out that the preferred embodiment of the invention contemplates the mounting of the entire tine assembly on a removable wall or bottom plate which can be quickly attached to, or removed from, the general bucket structure when it is necessary to repair or replace some part of the drive system to the tines or the tines themselves.

With the back hose apparatus which is provided in accordance with the present invention, the rate of earth removal is substantially improved, particularly in very hard or rocky soils, and the apparatus is easily maintained. Accordingly, several important objects are attained by the described structure and include the provision of an improved back hoe apparatus which can more effectively remove hard or rocky soils in an expeditious manner.

Another object of the invention is to provide a back hoe bucket having earth-penetrating tines mounted thereon, and a power unit for driving the tines in motion relative to the bucket, which apparatus is relatively economically constructed and is characterized in having a long and trouble-free operating life.

Another object of the invention is providing an improved back hoe assembly which can be easily maintained by the provision of access to the moving parts of the assembly.

In addition to the foregoing described objects and advantages, additional objects and advantages will become apparent as the following detailed description of the invention is read in conjunction with the accompanying drawings which illustrate the invention.

In the drawings:

FIGURE 1 is a view in elevation of the improved back hoe of the invention as it appears when connected behind a tractor vehicle.

FIGURE 2 is a side elevation view of the earth-removing bucket forming a portion of the back hoe of the invention with a portion of the bucket being broken away to better illustrate the hydraulic drive system for the earth-penetrating tines.

FIGURE 3 is a sectional view taken along line 3—3 of FIGURE 2.

FIGURE 4 is a sectional view taken along line 4—4 of FIGURE 3.

FIGURE 5 is a sectional view similar to FIGURE 3, but illustrating a different embodiment of the power drive system which can be used in the invention.

Figure 6:
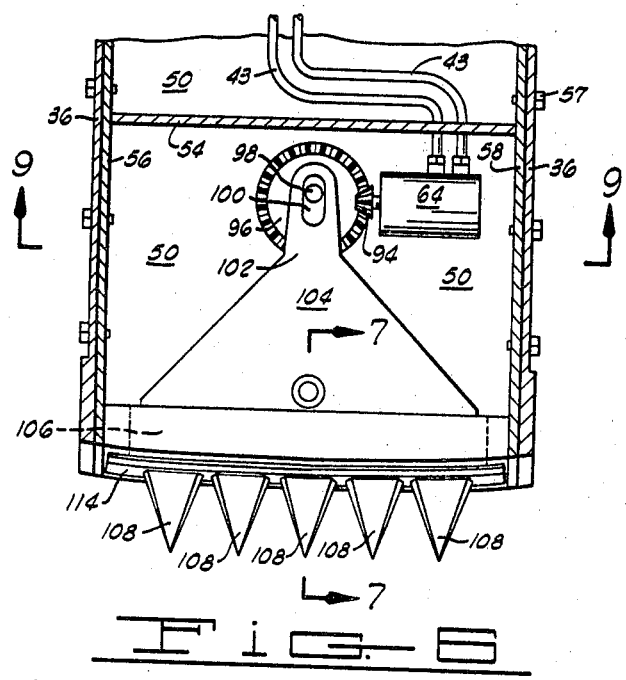
FIGURE 6 is a sectional view similar to FIGURES 3 and 5, but illustrating yet another power drive system used in another embodiment of the invention.

Referring now to the drawings in detail and particularly to FIGURE 1, a tractor vehicle 10 of conventional type has mounted on the rear end thereof, a back hoe assembly 12 and a pair of stabilizer supports 14. The back hoe assembly includes a main boom 16 which is pivotally connected at one of its ends to suitable brackets 17 at the rear of the tractor 10, and at its other end to an outer boom 18. The outer boom 18 is pivoted about its pivotal connection to the main boom 16 by a suitable hydraulic cylinder and piston rod 20 which is pivotally connected at one end to a bracket 21 carried by the main boom 16, and at its other end to a bracket 23 carried on the upper end of the outer boom 18.

A second hydraulic cylinder 22 is connected at its base to a bracket 24 mounted on the outer boom 18 intermediate the ends thereof, and contains a piston rod 26 which is connected to a pivot link 28 and to a drive link 30, the opposite ends of which are connected to the pivot link 28 and to a bracket 32 carried by the bucket 34 of the back hoe assembly.

The construction of the bucket 34 of one embodiment of the back hoe assembly of the present invention is best illustrated in FIGURE 2. As there illustrated, the bucket 34 includes a pair of horizontally spaced, vertically extending side plates 36 which have arcuately shaped back edges and a straight forward edge reinforced by a pair of reinforcing plates 38. At their arcuate back edges, and spaced inwardly from their bottom edges, the side plates 36 are welded or otherwise suitably connected to a curved plate 40 which extends transversely across the width of the bucket. It will be noted that the curved plate 40 forms both the back and the dirt supporting internal bottom of the bucket 34.

Centrally mounted on the curved plate 40 between the side plates 36 is a hydraulic conduit sheath member 42. The function of this sheath member is to enclose and protect hydraulic feed and discharge conduits 43 utilized to convey power fluid to the drive system which actuates the earth-penetrating tines forming an important part of the present invention.

The power driven, earth-penetrating tine unit of the invention which is detachably mounted on the bucket 34 is designated generally by reference character 48. The tine unit includes a bottom plate 50, a trapezoidally shaped bearing block 52 mounted adjacent the forward edge of the bottom plate 50, transversely extending central wall 54 which is secured at its lower edge to the bottom plate 50, and a pair of side walls 56 and 58 which extend from front to back of the shovel and are secured at their lower edges to the bottom plate 50. The tine unit 48 is dimensioned and constructed so that it can be quickly and easily attached to the bucket 34 in the position illustrated in FIGURE 2, or can be removed from the bucket very easily when it is desired to inspect the power mechanism which drives the tines in their earth-penetrating movement, or to repair this mechanism. As illustrated in FIGURES 2 and 3, when the tine unit 48 is connected to the bucket 34, it is positioned with the side walls 56 and 58 thereof positioned inside of and bearing against the side plates 36 of the bucket. It will also be noted that the top of the bearing block 52 bears against the under side of the forward portion of the curved plate 40. The forward or leading edge of the bottom plate 50 is sharpened to provide a cutting edge which is aligned with the tapered leading edge of the trapezoidally shaped bearing block 52.

Mounted on the bottom plate 50 just forward of the transversely extending central wall 54 is a hydraulic motor 64. Suitable holes or apertures (not shown) are provided in the central wall 54 to permit the flexible hydraulic power fluid conduits from the open topped chamber defined by the side walls 56 and 58, bottom plate 50 and central wall 54 to be passed through the central wall and connected to the hydraulic motor 64. The hydraulic motor 64 is used to drive a chain 66 which engages a sprocket 68 keyed to a cam shaft 70. The cam shaft 70 is rotatably journaled at opposite ends in a pair of bearing blocks 72 and 74 rigidly mounted on the side walls 56 and 58 of the tine unit. The cam shaft 70 is also rotatably journaled in a plurality of vertically extending support members 75 which are mounted on the bottom plate 50 of the tine unit 48.

Horizontally spaced along its length, the cam shaft 70 is provided with a plurality of eccentrically offset throws 76 to each of which is pivotally connected a connecting rod 78. At their opposite ends, the connecting rods 78 are each pivotally connected through a knuckle joint 80 to a blade shank 82. Each of the blade shanks 82 extends through a bearing slot in the trapezoidally shaped bearing block 52, the construction being such that a seal is provided around each of the blade shanks 82 with each shank being slidingly mounted in the bearing block 52. At its outer end, each blade shank 82 carries a tine or blade 84 which terminates in converging lower side cutting edges and a point 86. The blades 84 are detachably mounted on the blade shanks 82 so that the blades can be replaced if they become dulled or fractured by extended usage of the tine unit and the bucket which carries the unit.

Operation

In the operation of the improved back hoe assembly of the invention, the bucket 34 of the assembly is manipulated in substantially the same manner of manipulation as has previously characterized back hoe units. Thus, by use of the main boom 16 and outer boom 18, along with the hydraulic cylinder and piston units which are provided, the bucket 34 may be inclined at substantially any angle with respect to the ground so that the tines 84 are inclined directly into the earth at a desired angle. The assembly may then be utilized by actuating the tines so that the blade shank 82 and the blades 84 which they carry are rapidly reciprocated in out-of-phase relation to each other, or the tines may be permitted to remain stationary when relatively rough soil is encountered, thus avoiding excessive wear on the drive mechanism and upon the tines 84.

When it is desired to drive the tines 84 in the reciprocating, earth-penetrating movement, an appropriate lever or switch on a control panel mounted on the tractor 10 is thrown so as to direct hydraulic fluid through the hydraulic fluid conduits 43 to and from the hydraulic motor 64. When the hydraulic motor 64 is actuated, the chain 66 is driven thereby to rotate the crankshaft 70. Due to the eccentricity of the throws 76 on the crankshaft 70, the blade shanks 82 and the tines 84 carried thereby are driven in a reciprocating motion by the connecting rods 78. The throws 76 are circumferentially spaced or offset from each other around the crankshaft 70 so that the tines 84 are driven in out-of-phase relation to each other with different ones of the blades striking or penetrating the earth at different times. Then, a series of rapidly occurring blows or impacts are consecutively employed to break up or loosen the earth in advance of the forward lip of the bucket 34, permitting the bucket to move through the earth and remove it without difficulty.

As has been heretofore pointed out, the tine unit 48 can be quickly detached from the bucket 34 when it is desired to repair a portion of the drive mechanism or replace one of the blade shanks 82 which may become fractured or weakened by metal fatigue. Also, it should be noted that by providing suitable seals around the apertures which permit the hydraulic conduits 43 to be passed through the central wall, the entire space around the hydraulic motor 64, the crankshaft 70 and the connecting rods 78 may be filled with lubricant fluid and confined in this space by the bottom plate 50, side walls 56 and 58, the transverse central wall 54 and the trapezoidally shaped bearing block 52.

Two modifications of the invention are illustrated in FIGURES 5 through 9. In FIGURE 5, the drive system is slightly modified so that each of the blade shanks 82 and tines 84 which are carried thereby are driven synchronously and reciprocate in phase with each other. In this embodiment of the invention, substantially the same elements of the drive system are provided as depicted in FIGURES 2, 3 and 4, except that the crankshaft 90 which is provided in FIGURE 5 contains only two eccentric throws 92 which are circumferentially aligned on the crankshaft, and which move the connecting rods 78 in in-phase motion. The tines 84 thus all simultaneously deliver their impact to the soil ahead of the bucket 34.

Figures 7, 8:
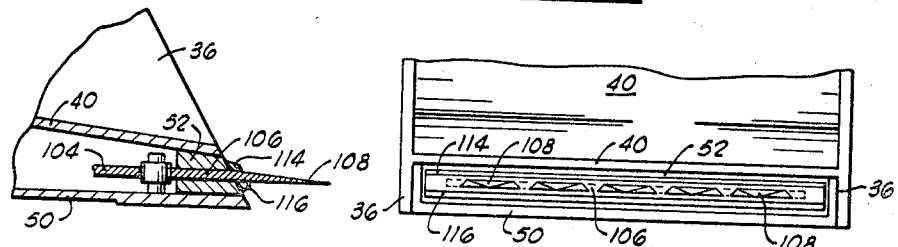
FIGURE 7 is a sectional view taken along line 7—7 of FIGURE 6.
FIGURE 8 is a view in elevation of the lower portion of the front of the bucket used in the embodiment shown in FIGURE 6.
Figure 9:
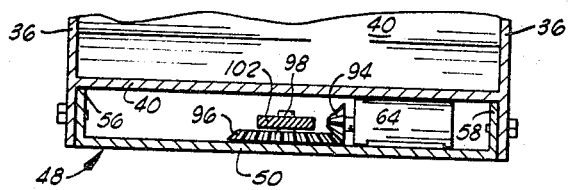
FIGURE 9 is a sectional view taken along line 9—9 of FIGURE 6.

In the embodiment of the invention illustrated in FIGURES 6 and 7, the hydraulic motor 64 drives a bevel gear 94 which meshes with a relatively large bevel gear 96. The bevel gear 96 is rotatably supported on the bottom plate 50 of the tine unit 40 for rotation about a vertical axis, and is provided with an eccentrically located, upwardly projecting stud 98. As the bevel gear 96 is rotated, the stud 98 revolves about the axis of rotation of the bevel gear. The stud 98 projects through an elongated slot 100 formed in the neck portion 102 of a blade carriage 104. The forward portion of the blade carriage 104 is a large flat plate which is pivotally supported on the bottom plate 50 of the tine unit 48 and terminates at its forward edge in a multi-pointed earth-penetrating member 106. The earth-penetrating member 106 has a plurality of sharply pointed tines 108 which are also sharpened along each of the converging sides thereof to a cutting edge. It will be noted that the member 106 extends in an elongated slot 112 formed in the trapezoidally shaped bearing block 52 so that the member 106 can slide in the slot thus provided. The assembly is sealed against the infiltration of dirt through the slot which passes the member 106. Sealing flange 114 and 116 extend upwardly and downwardly respectively from the member 106 and bear against the forward surface of the trapezoidal bearing block 52 to further enhance the seal. It will be noted that the bearing block 52 is curved along its forward edge to accommodate the motion of the member 106.

In the case of the embodiment illustrated in FIGURES 6 and 7, an oscillating movement is imparted to the carriage 104 and ultimately to the pointed tines 108 carried on the member 106. The tines 108 thus undergo a very small amount of forward movement, and a concurrent relatively large horizontal oscillating movement. The oscillating or sideways motion of the pointed tines 108, together with the small increment of fore-and-aft movement imparted to these tines as they move from side to side, provides a very effective cutting action which permits them to gouge and penetrate into hard and rocky soils so that the bucket can be utilized more effectively. As in the case of the embodiments hereinbefore described, the tine unit 48 can be completely filled with lubricant so that all moving parts are continuously lubricated.

From the foregoing description of the invention, it will be apparent that the improved back hoe assembly of the invention permits earth of a relatively hard character to be expeditiously excavated, and permits the powered back hoe to be used with the tines either actuated and undergoing their earth-penetrating movement, or de-actuated, in which case the tines still provide a fixed gouging and earth-penetrating element which assists the sharpened leading edge of the bucket in moving through the ground to remove large quantities of earth in an expeditious manner.

Although certain specific embodiments of the invention have been herein described as exemplary of the manner in which the basic principles of the invention are applied in physical structure, it is to be understood that various changes and modifications can be made in the several typical structures illustrated without departure from these basic principles. All such modifications and innovations which continue to rely upon the basic principles of the invention are deemed to be circumscribed by the spirit and scope of the invention except as the same may be necessarily limited by the appended claims or reasonable equivalents thereof.

What is claimed is:

1. In earth moving equipment of the type including a vehicle, a support structure mounted on the vehicle and an earth-removing bucket pivotally mounted on the support structure, the improvement which comprises
    a plurality of earth-penetrating tines movably mounted on the lower side of said bucket and adjacent the open, earth contacting forward side of said bucket, said tines projecting from said bucket for penetrating the earth ahead of said earth-removing bucket;
    a hydraulic motor;
    a first bevel gear driven by said hydraulic motor;
    a second bevel gear drivingly engaged by said hydraulic motor and supported on said bucket for rotation about an axis;
    an eccentric stud projecting from said second bevel gear; and
    a blade carriage carrying said tines and pivotally mounted on said bucket adjacent the bottom of said bucket and having a neck portion passing over said second bevel gear, said neck portion having an elongated slot therein engaging said eccentric stud whereby said blade carriage is oscillated about its pivotal axis as said second bevel gear is rotated.

2. In earth moving equipment of the type including a vehicle, a support structure mounted on the vehicle, and an earth-removing bucket pivotally mounted on the support structure, the improvement which comprises:
    a plurality of earth-penetrating tines movably mounted on the lower side of the bucket and adjacent the open, earth contacting, forward side of said bucket, said tines projecting from said bucket for penetrating the earth ahead of said earth-removing bucket;
    a bottom plate secured beneath said bucket;
    a pair of opposed side plates secured to, and extending substantially normal to, said bottom plate and connected to said bucket to space said bottom plate from the earth supporting portion of said bucket and form therewith an enclosure;
    a bearing block extending between said side plates and secured to said bottom plate at the leading edge thereof adjacent the open forward part of said bucket to seal said enclosure;
    said side plates being detachably secured to said earth supporting portion of said bucket and forming with said bottom plate and bearing block, a removable unit quickly detachable from said bucket;
    a motor mounted on said bottom plate in said enclosure;
    a crankshaft extending across said bottom plate and having its ends rotatably journaled in said side plates;
    drive means interconnecting said motor and said crankshaft for driving said crankshaft in rotation;
    connecting rods interconnecting the crankshaft with said earth-penetrating tines for converting the rotary motion of the crankshaft to reciprocating motion of the tines; and
    blade shanks extending slidingly through said bearing block and interconnecting said tines with said connecting rods.

3. An improved back hoe apparatus comprising:
    a main boom;
    an outer boom pivotally mounted on said main boom for pivotation about a horizontal axis;
    a bucket pivotally mounted on one end of said outer boom for pivotation about a horizontal axis, said bucket having a back side and a front side, and further comprising
        a pair of horizontally spaced, parallel bucket side plates;
        a curved plate connected between said bucket side plates and forming the back side and dirt-supporting bottom of said bucket;
        a bottom plate converging with and meeting said curved plate at the back of said bucket and spaced from the curved plate opposite the portion thereof forming the dirt-supporting bottom of the bucket;

a pair of horizontally spaced second side plates secured to said bottom plate and interconnecting said bottom plate with said curved plate to to define a space therebetween;

a bearing block extending across the front of said bucket between said horizontally spaced second side plates and closing said space therebetween;

a hydraulic drive system drivingly connected to said outer boom and to said bucket for pivoting said outer boom on said main boom and said bucket on said outer boom;

a hydraulic motor mounted on said bottom plate and disposed in said chamber;

a plurality of blade shanks extending slidingly through said bearing block and sealingly engaged by said bearing block, said blade shanks each having an inner end disposed inside said chamber and an outer end outside said chamber and spaced from the front side of said bucket;

an earth-penetrating tine on the outer end of each of said blade shanks;

driving means in said chamber and drivingly interconnecting said hydraulic motor and the inner ends of said blade shanks, said bottom plate, second side plates and bearing block, forming with the hydraulic motor mounted thereon and with the blade shanks and driving means, an enclosed power unit quickly detachable from the under side of said bucket to facilitate maintenance, lubrication and the like; and means for conveying hydraulic power fluid to said hydraulic motor.

4. An improved back hoe apparatus as defined in claim 3 wherein said driving means comprises a crankshaft rotatably driven by said hydraulic motor, said crankshaft having a plurality of eccentric throws spaced longitudinally therealong; and connecting rods pivotally interconnecting said throws and the inner ends of said blade shanks.

5. An improved back hoe as claimed in claim 3 wherein said means for conveying hydraulic power fluid to said hydraulic motor comprises a hydraulic fluid feed conduit and return conduit; and a rigid means enclosing and protecting said hydraulic fluid conduits and retaining said conduits against the black side of said bucket on the inside thereof.

References Cited

UNITED STATES PATENTS

| | | | |
|---|---|---|---|
| 1,067,375 | 7/1913 | Proctor | 37—141 XR |
| 1,878,037 | 9/1932 | Vodoz | 37—141 XR |
| 2,228,445 | 1/1941 | De Velbiss. | |
| 2,245,544 | 6/1941 | Miller | 299—37 |
| 2,393,432 | 1/1946 | Turner | 37—118 |
| 2,443,492 | 6/1948 | Austin | 37—141 |
| 2,619,748 | 12/1952 | McIntosh | 37—141 |
| 2,657,480 | 11/1953 | Armington et al. | |
| 2,704,613 | 3/1955 | Biedess | 37—141 XR |
| 2,777,680 | 1/1957 | Robb | 299—37 |
| 2,850,815 | 9/1958 | Edwards | 37—141 |
| 3,065,557 | 11/1962 | Pewthers | 37—141 XR |
| 3,084,817 | 4/1963 | Lovrenich. | |
| 3,145,488 | 8/1964 | French | 37—141 |
| 3,219,388 | 11/1965 | Haynes | 299—37 |
| 3,269,039 | 8/1966 | Bodine | 37—141 XR |
| 3,272,559 | 9/1966 | Haynes | 37—141 XR |
| 3,293,778 | 12/1966 | McAuliff | 37—141 |
| 3,328,904 | 7/1967 | Voight et al. | 37—142 |

EDGAR S. BURR, *Primary Examiner.*

U.S. Cl. X.R.

37—103; 214—138